(12) United States Patent
Baik et al.

(10) Patent No.: US 8,040,000 B2
(45) Date of Patent: Oct. 18, 2011

(54) STATOR COOLING STRUCTURE FOR SUPERCONDUCTING ROTATING MACHINE

(75) Inventors: Seung-Kyu Baik, Changwon-si (KR); Young-kil Kwon, Jinhae-si (KR); Ho-min Kim, Changwon-si (KR)

(73) Assignee: Korea Electrotechnology Research Institute (KR)

( * ) Notice: Subject to any disclaimer, the term of this patent is extended or adjusted under 35 U.S.C. 154(b) by 162 days.

(21) Appl. No.: 12/430,810

(22) Filed: Apr. 27, 2009

(65) Prior Publication Data
US 2010/0225183 A1 Sep. 9, 2010

(30) Foreign Application Priority Data
Mar. 9, 2009 (KR) .................. 10-2009-0019669

(51) Int. Cl.
*H02K 9/19* (2006.01)
(52) U.S. Cl. ............ 310/54; 310/216.016; 310/216.002
(58) Field of Classification Search .................... 310/52, 310/54, 216.16, 216.002
See application file for complete search history.

(56) References Cited

U.S. PATENT DOCUMENTS

| | | | | |
|---|---|---|---|---|
| 2,844,745 A | * | 7/1958 | Hamm | ........................ 310/57 |
| 4,134,054 A | * | 1/1979 | Akamatsu | ................ 318/685 |
| 7,348,707 B2 | * | 3/2008 | Laskaris et al. | ......... 310/216.007 |
| 2002/0079783 A1 | | 6/2002 | Hopeck | |
| 2007/0194638 A1 | * | 8/2007 | Birdi et al. | .................. 310/54 |
| 2007/0200440 A1 | * | 8/2007 | Kalsi et al. | ................... 310/54 |
| 2010/0225183 A1 | * | 9/2010 | Baik et al. | .................... 310/58 |

FOREIGN PATENT DOCUMENTS
JP 61-161936 * 7/1986
* cited by examiner

*Primary Examiner* — Karl Tamai
(74) *Attorney, Agent, or Firm* — Park & Associates IP Law, P.C.

(57) ABSTRACT

Disclosed herein is a structure for cooling the stator of a superconducting rotating machine. The structure includes a stator coil. Slots are axially disposed at the stator coil to support the stator coil, and a space is defined between the slots to allow the stator coil to be partially exposed. A stator yoke is disposed on the slots such that a space is defined between the exposed portion of the stator coil, the slots and the stator yoke. A cooling tube is disposed in the space defined between the exposed portion of the stator coil, the slots and the stator yoke, thus simultaneously cooling both the stator coil and the stator yoke.

6 Claims, 7 Drawing Sheets

(PRIOR ART)

FIG. 1

(PRIOR ART)

FIG. 2

(PRIOR ART)

FIG. 3

(PRIOR ART)

FIG. 4

(PRIOR ART)

STATOR COOLING STRUCTURE FOR SUPERCONDUCTING ROTATING MACHINE

FIELD OF THE INVENTION

The present invention relates generally to a structure for cooling the stator of a superconducting rotating machine, for example, such as, a superconducting motor or generator and, more particularly, to a stator cooling structure for a superconducting rotating machine, in which a stator coil and a stator yoke are exposed to a space provided between slots and a cooling tube is wound around the exposed space, so as to directly cool both the stator coil and the stator yoke through the cooling tube.

BACKGROUND OF THE INVENTION

The stators of most conventional motors are cooled through the natural convection or forced convection of air. Some stators may be cooled using water or oil. The density of an electric current which may flow in a stator coil in the case of using the air cooling method is relatively lower than that of an electric current in the case of using the water or oil cooling method. However, the air cooling method using natural convection never requires an additional cooling device, and the air cooling method using forced convection requires the installation of only a cooling fan (blower).

The water/oil cooling method is used in relatively large capacity motors of 1000 horsepower or more, and is higher in the density of current which may flow in the stator coil in comparison with the air cooling method. But, a cooling device using the water/oil cooling method becomes very complicated.

Figure 1:
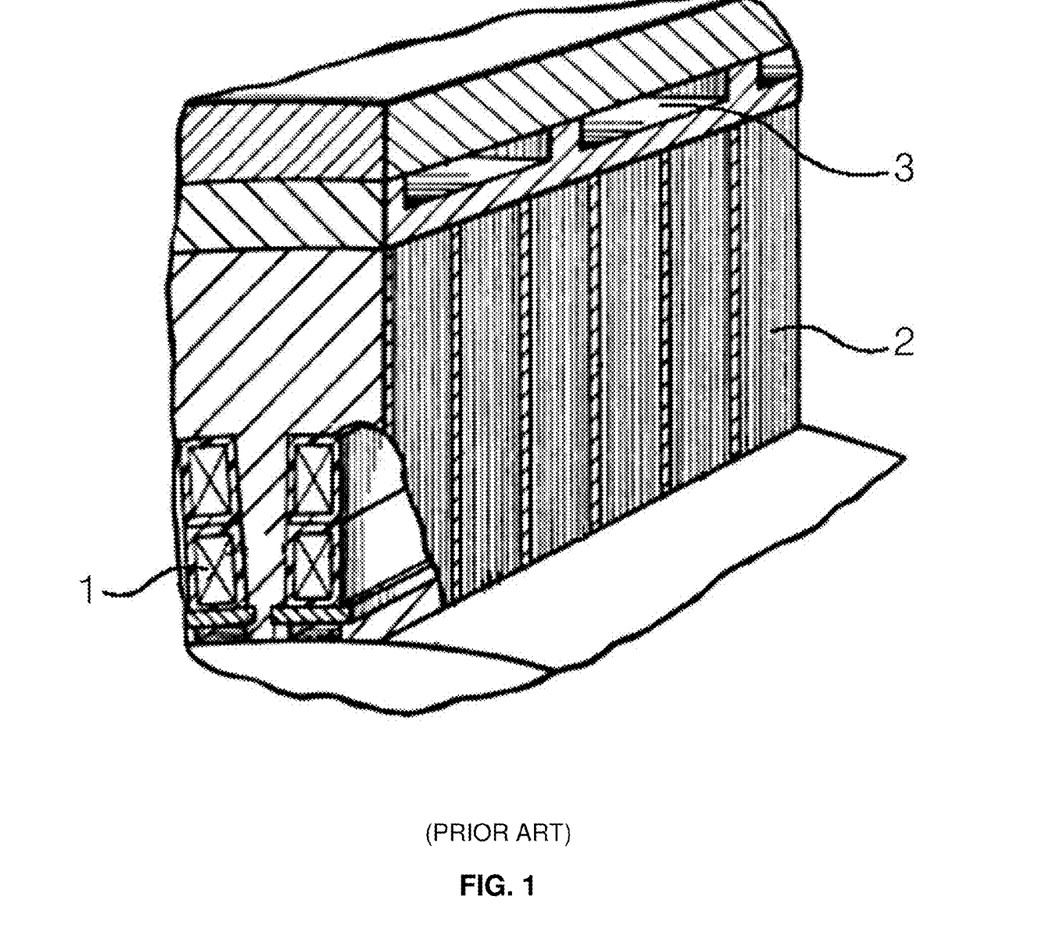
FIG. 1 is a perspective view illustrating the stator of a conventional water/oil cooled motor.

Generally, as shown in FIG. 1, the conventional water or oil cooling method for motors is not the method of directly cooling stator coils 1 from which the most heat is emitted, but is the method of cooling a stator core 2 surrounding the coils 1, thus eliminating generated heat through heat transfer between the stator core 2 and the stator coils 1. Therefore, thanks to passages 3 through which water or oil flows, the stator yoke core is cooled.

In the conventional motor, the stator coils are surrounded by the core which has superior heat transfer ability. Thus, even though the cooling passages are provided only in a stator yoke part, the stator coils can be sufficiently cooled.

Meanwhile, a superconducting rotating machine such as a superconducting motor or generator uses superconducting coils which may generate the strong magnetic field without using the core. Since a conventional rotating machine uses coils made of copper, it is difficult to obtain a desired output power unless the core is used, and an air gap between a stator core and a rotor core is very small so as to maximize flux linkage between stator coils and rotor coils. Thus, the stator coils are disposed between slots formed in the core, thus minimizing the air gap between the stator and the rotor. However, a magnetic field concentrates on the slots formed in the core, so that the loss of an alternating current in the slots is larger than that in other parts when the magnetic field generated by the rotor rotates. Further, the slots are different in permeability from the coils, thus causing the increase in the distortion factor of the waveform of generated voltage.

In order to solve the problems of the conventional machine, the stator slot of the superconducting rotating machine is not made of the iron core but is made of a non-magnetic material such as fiber-glass reinforced plastics (FRP). Therefore, this is advantageous in that there is no loss in the slot and the waveform of generated voltage is very sinusoidal. However, since the heat conductivity of FRP is a lot smaller than that of the core, heat generated in the stator coils is not easily dissipated.

Figure 2:
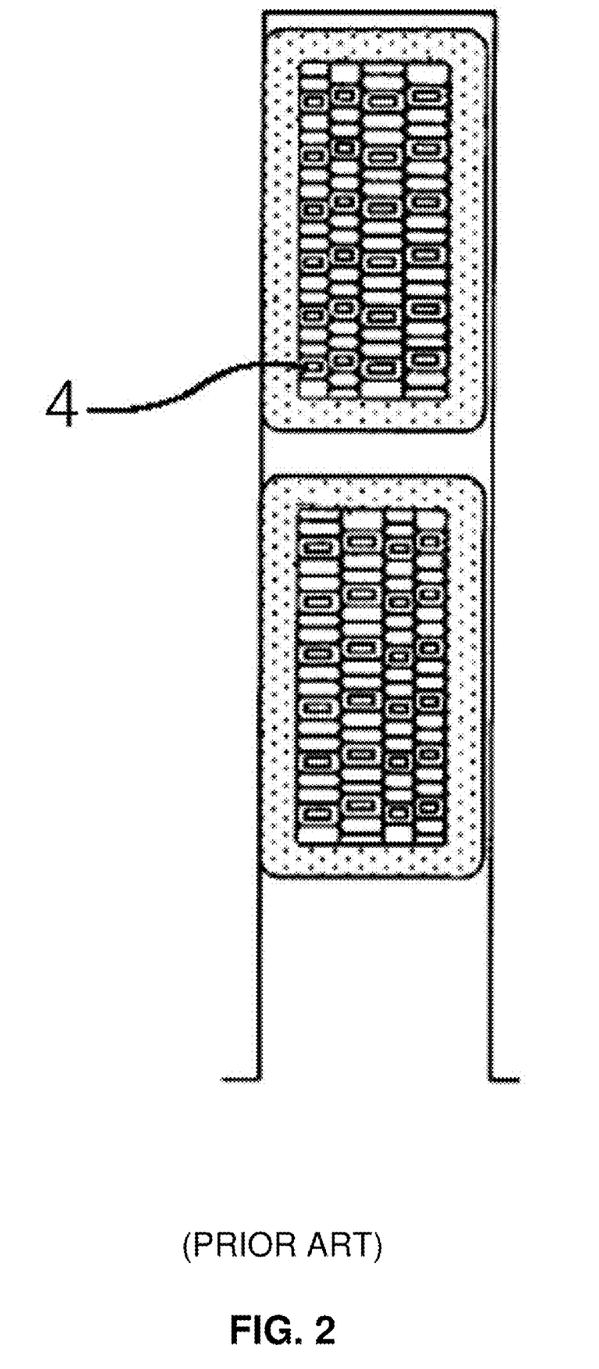
FIG. 2 is a cross-sectional view illustrating the internal structure of a stator slot of a conventional water/oil cooled generator.

In an existing large machine such as a vessel propelling motor or turbine generator, cooling tubes 4 are disposed between the stator coils as shown in FIG. 2 or a cooling passage is provided in each coil, thus forming a water/oil cooling structure.

Figure 3:
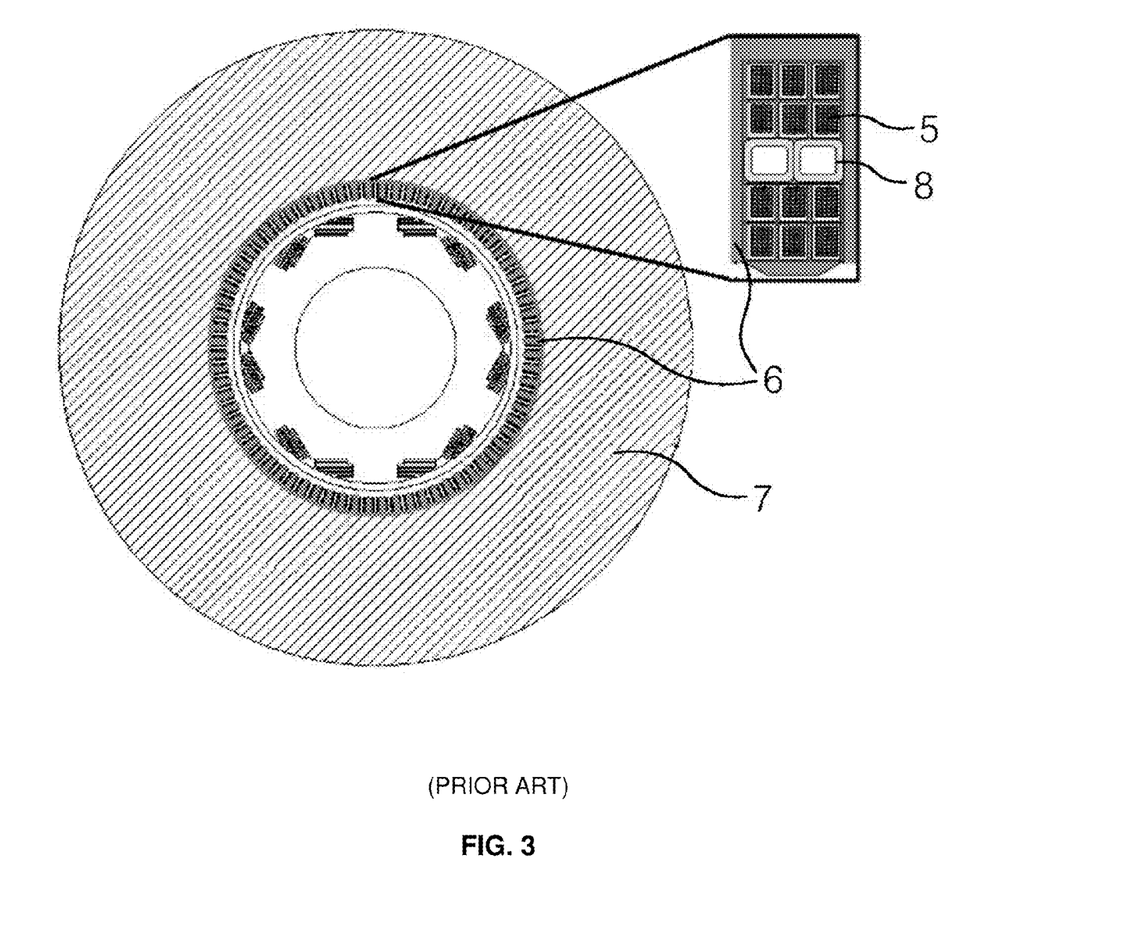
FIG. 3 is a transverse sectional view illustrating a conventional water (oil) cooled superconducting motor or generator.
Figure 4:
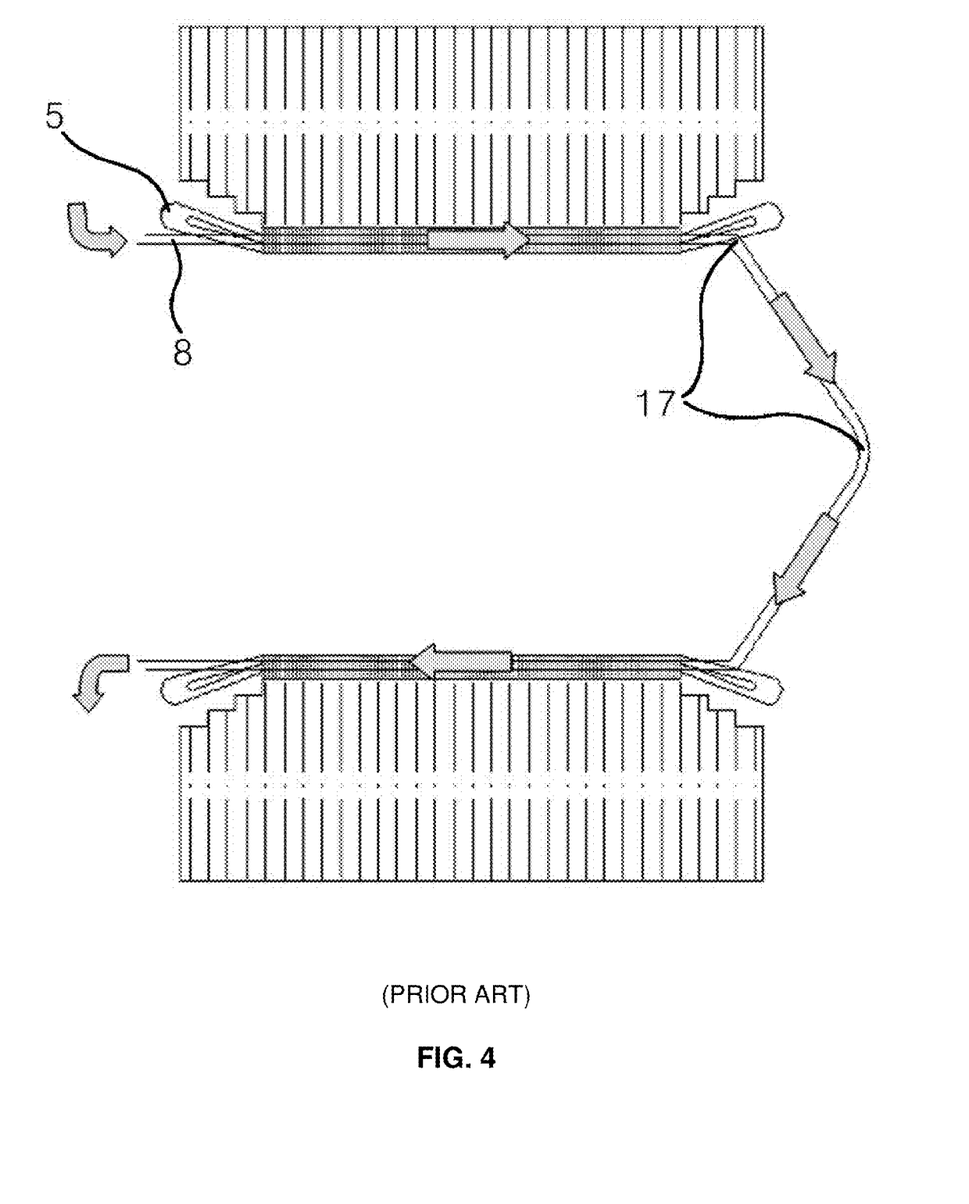
FIG. 4 is a vertical sectional view illustrating the conventional water/oil cooled superconducting motor or generator.

Most water/oil cooling structures for stators of superconducting rotating machines which have been developed until now have a configuration used in the conventional rotating machine, as shown in FIGS. 3 and 4. That is, cooling tubes 8 must be wound together with stator coils 5 in narrow slots in FRP 6. According to the bent shape of each stator coil 5, the cooling tubes 8 are bent, thus forming bent portions 17. The cooling tubes 8 of the respective portions must be welded in several places. Thus, the cooling tubes 8 are apt to become narrow or clogged, and it is very difficult to manufacture. Further, since the cooling tubes 8 are disposed in spaces in the stator slots which are to be occupied by conductors, the ratio of the stator conductors occupied in the slots is reduced, thus causing an increase in the size of the machine.

Figure 5:
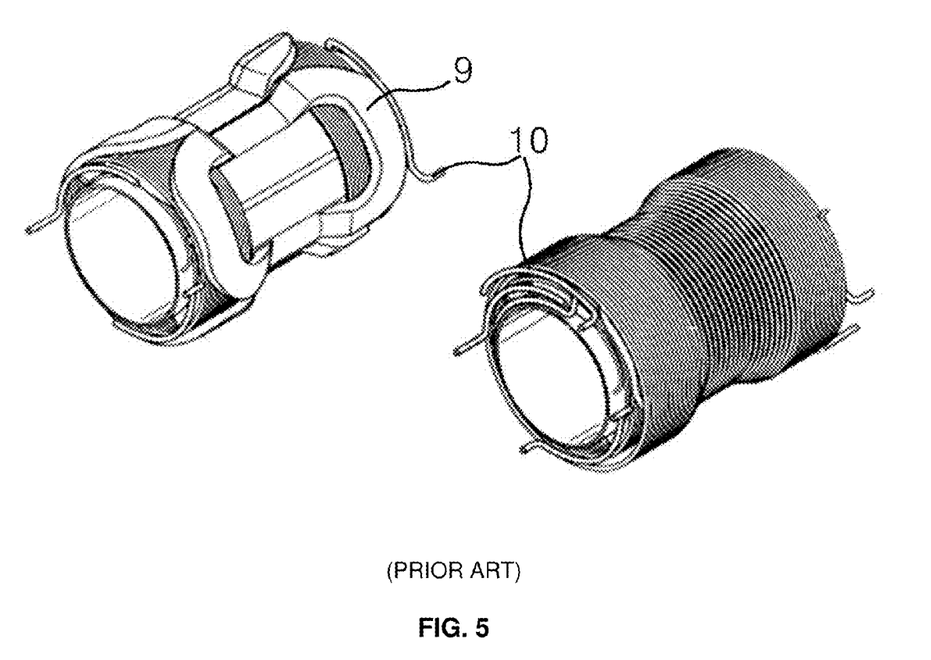
FIG. 5 is a perspective view illustrating conventional stator coils and cooling tubes.

As a stator cooling structure which is different from the conventional cooling structure, U.S. Pat. No. 6,489,701 B1 has been proposed, which is shown in FIG. 5. The stator cooling structure is configured such that a slot is omitted and stator coils 9 are wound in a single layer. Cooling tubes 10 are provided on the upper and lower portions of the stator coils 9 of the single layer in such a way as to surround the stator coils 9 in a spiral form. Since the stator cooling structure has no structure for supporting electromagnetic force (torque) applied to the stator coils 9, it is suitable for an industrial motor which rotates at 1800 rpm or higher and applies relatively small electromagnetic force on the stator coils.

However, a very large electromagnetic force acts on the stator coils of a vessel propelling motor or wind turbine which rotates ten or more times slower than a general industrial motor but on which large torque acts. Thus, unless a slot for supporting the stator coils 9 is used as shown in FIG. 5, a machine may be broken or damaged.

Further, the cooling structure is an integrated structure wherein the cooling tubes 10 completely surround the stator coils. Hence, when the stator coils 9 are burn out, it is difficult to repair just them in isolation. The multiple phase coils overlap each other, so that electric insulation may easily deteriorate. Thus, the cooling structure may be applied to a high-speed and low-torque industrial motor, in which a relatively small electromagnetic force acts on the stator coils. However, the cooling structure is unsuitable for a low-speed and high-torque industrial vessel propelling motor or wind turbine, in which a very large electromagnetic force acts on the stator coils. A structure for supporting high torque is required.

Further, because of the cooling tubes 10 covering the upper and lower portions of the coils, the volume of the stator coils is increased, and thus the size of the machine is further increased. When the cooling structure is compared with other structures, the air gap between superconducting field coils and stator coils is increased. Thus, in order to ensure a flux linkage for a desired output power, a larger amount of expensive superconducting wires is required in filed coils, so that manufacturing costs are undesirably increased.

SUMMARY OF THE INVENTION

Accordingly, the present invention has been made keeping in mind the above problems occurring in the prior art, and an object of the present invention is to provide a stator cooling structure for a superconducting rotating machine, in which a water/oil cooling method exhibiting higher cooling efficiency than an air cooling method is applied to a low-speed and high-torque superconducting rotating machine, and both a stator coil and a stator yoke are simultaneously cooled directly through a cooling tube without removal of slots for supporting high generated torque.

In order to accomplish the above object, the present invention provides a structure for cooling the stator of a superconducting rotating machine. The structure includes a stator coil. Slots are axially disposed at the stator coil to support the stator coil, and a space is defined between the slots to allow the stator coil to be partially exposed. A stator yoke is disposed around the slots to have the exposed space between the slots. A cooling tube is disposed in the exposed space of the stator coil and stator yoke and between the the stator coil and the stator yoke, in order to simultaneously cool both the stator coil and the stator yoke.

The space defined between the exposed portion of the stator coil, the slots and the stator yoke may include a plurality of spaces which are axially arranged.

The cooling tube may be wound spirally on the exposed portion of the stator coil. The cooling tube may be wound spirally on the exposed portion of the stator coil and be connected to an adjacent cooling tube at an outside of the stator yoke.

The cooling tube may be fitted in an inlet and outlet path formed in the stator yoke and connected to the adjacent cooling tube at the outside of the stator yoke.

As described above, the present invention is advantageous in that a cooling tube simultaneously contacts both a stator coil and a stator yoke, thus simultaneously cooling the stator yoke as well as the stator coil.

Further, the cooling tube is not disposed in a stator slot, thus preventing the cooling tube from becoming clogged at the bent portion of the tube. It is not necessary to connect several cooling tubes to each other, thus reducing the clogging of the cooling tubes which may occur when they are welded to each other. A worker has only to spirally wind the cooling tube outside the stator coil, so that the manufacture of a stator cooling structure is very simple, a compact machine is achieved, and the ratio of the stator coil to be occupied in the slot can be increased. Flux linkage between the cooling tube and a rotor is very small, thus considerably reducing eddy current which may be generated in the cooling tube.

Further, the slot is provided in a stator, thus being capable of supporting electromagnetic force (torque) acting on the stator coil, especially a very large electromagnetic force which may be generated in a low-speed and high-torque vessel propelling motor or wind turbine.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

The present invention is directed to a cooling structure for efficiently eliminating heat generated from the stator coil of a superconducting rotating machine, that is, a superconducting motor or generator. Instead of arranging water/oil cooling tubes in slots, cooling tubes are spirally placed between the outside portion of a stator coil and a stator yoke, so that non-magnetic slots are maintained to withstand electromagnetic force acting on the stator coil. Further, spaces are provided axially between the slots, so that the spiral cooling tubes are disposed in the spaces. Thereby, the stator cooling structure for the superconducting rotating machine is capable of cooling the stator yoke as well as the stator coil.

Figure 6:
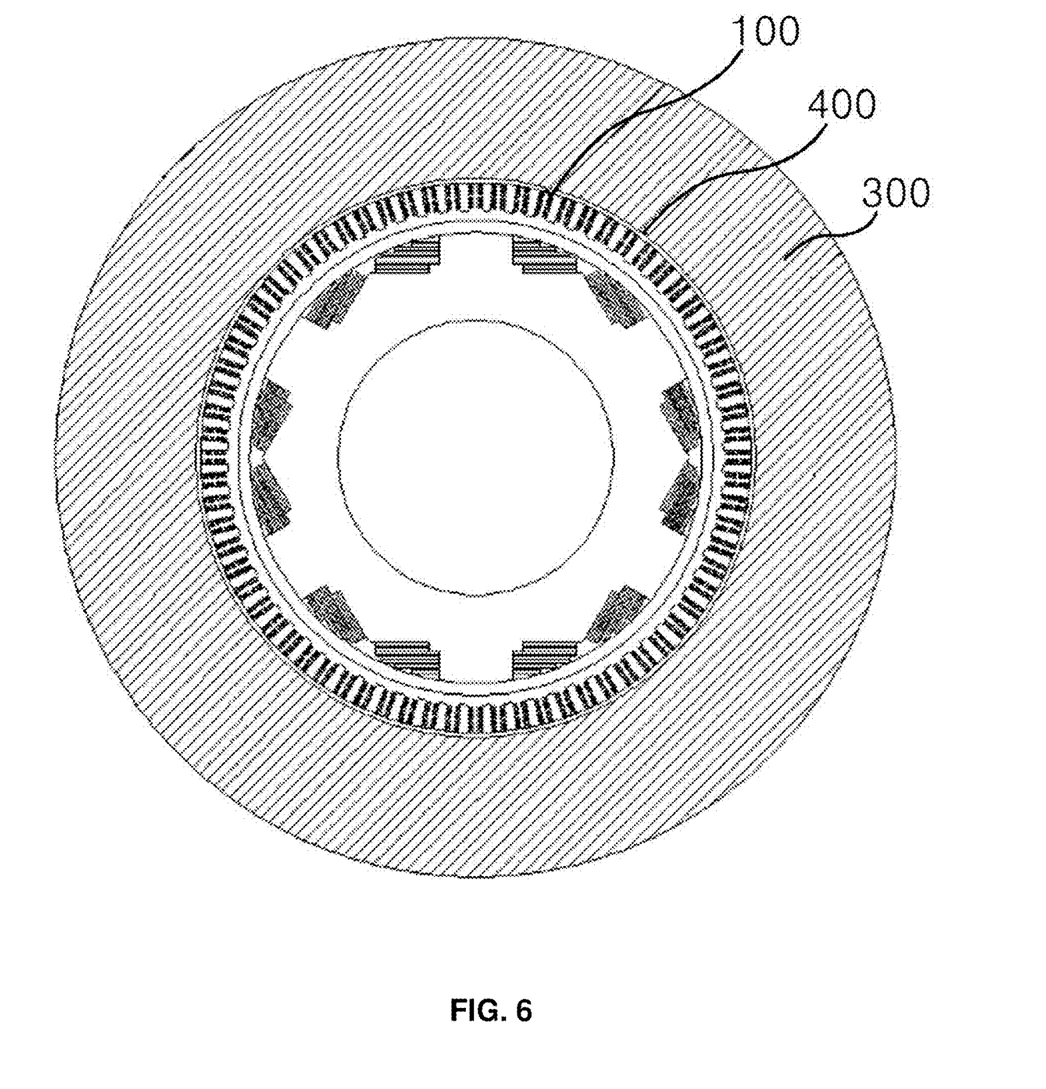
FIG. 6 is a transverse sectional view illustrating a superconducting motor or generator according to the present invention.
Figure 7:
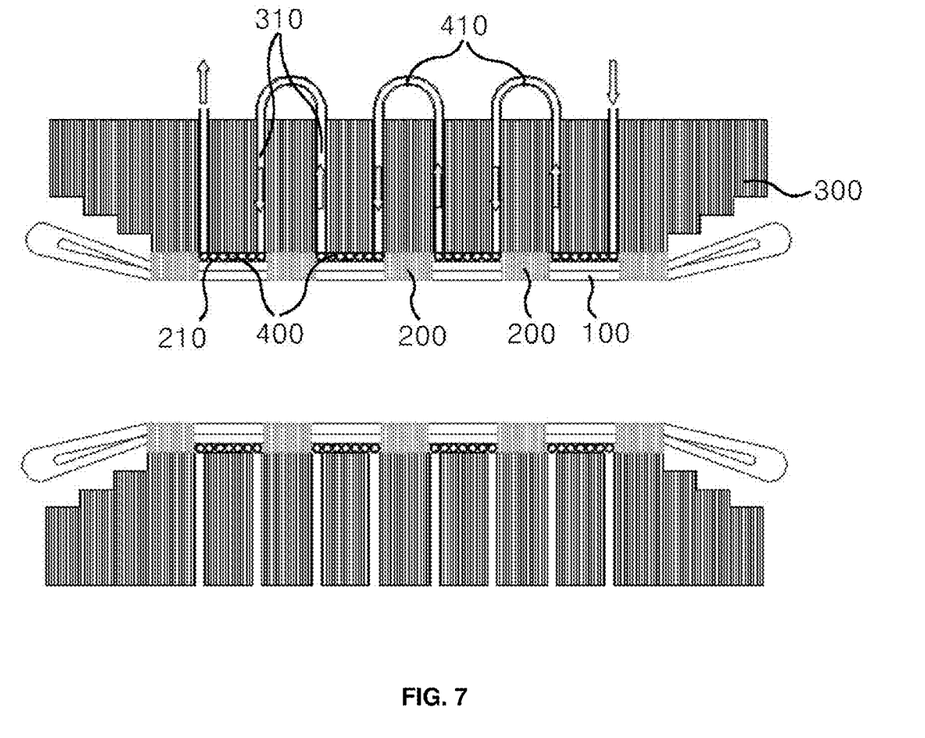
FIG. 7 is a vertical sectional view illustrating the superconducting motor or generator according to the present invention.

Hereinafter, the preferred embodiment of the present invention will be described in detail with reference to the accompanying drawings. FIGS. 6 and 7 are a transverse sectional view and a vertical sectional view, respectively, illustrating the stator cooling structure for the superconducting rotating machine according to the present invention.

Referring to the transverse sectional view of FIG. 6, cooling tubes 400 are disposed circumferentially between a stator coil 100 and a stator yoke 300. Referring to the vertical sectional view of FIG. 7, spaces 210 are formed between slots 200 which are axially disposed with intervals therebetween and formed by a non-magnetic material such as FRP. Each cooling tube 400 is disposed in the empty space surrounded by portion of the stator coil 100 which is exposed to the outside through each space 210, the stator yoke 300 and the FRP slots 200, so that the cooling tube 400 simultaneously contacts both the stator coil 100 and the stator yoke 300, thus allowing both the stator coil 100 and the stator yoke 300 to be simultaneously cooled.

As such, each cooling tube 400 is not disposed in the slot 200, so that the cooling tube 400 does not clog at its bent portion. Further, it is not necessary to connect several tubes to each other, thus reducing the clogging which may occur when tubes are welded to each other.

Further, since the slots 200 are provided in the stator, it is possible to support the electromagnetic force (torque) acting on the stator coil 100, especially the very large electromagnetic force which is generated in a low-speed and high-torque vessel propelling motor or wind turbine. Further, since each cooling tube 400 is not disposed in the associated stator slot 200, the size of the slot 200 can be reduced, and the ratio of the stator coil occupied in the slots 200 is increased. Thereby, the cooling structure can be designed to have higher power density than a cooling structure using a conventional method. Since an additional connector for supplying cooling water/oil to the end of the coil is not required, the axial length of the machine can be reduced.

Here, according to the intensity of the electromagnetic force applied to the stator coil 100 or the size of the stator coil 100, a plurality of spaces 210 may be formed axially between the slots 200, and cooling tubes 400 are wound in the respective spaces 210.

Further, each cooling tube 400 is spirally wound around the exposed part of the stator coil 100 in a circumferential direction. The cooling tube 400 which is spirally wound around each exposed part of the stator coil 100 is connected to an adjacent cooling tube 400 at the outside of the stator yoke.

Thus, the conventional method of arranging the cooling tube 400 in the slot 200 is problematic in that the cooling tube 400 is inserted into the slot 200 when the stator coil 100 is wound, so that construction is complicated and the manufacture is difficult. In contrast, according to the present invention, a worker has only to spirally wind the cooling tube 400 outside the stator coil 100, so that the manufacture is very simple. Further, since the cooling tube 400 is wound in a circumferential direction, there is no bent portion. Further, the number of connected parts (welded parts) between cooling tubes 400 can be reduced, thus considerably reducing the clogging of the tubes 400. Furthermore, the flux linkage between the cooling tubes 400 and the rotor is very small, thus considerably reducing eddy current which may be generated in the cooling tubes 400.

When the cooling tubes 400 are connected to each other at the outside of the stator yoke, the cooling tubes 400 are fitted in inlet and outlet paths 310 which are formed in the stator yoke 300 made by laminating silicon steel sheets, so that the cooling tubes 400 come into and out of the stator coil 100.

Here, the terminus of the cooling tube 400 which is drawn into and out each inlet and outlet path 310 is welded to the terminus of an adjacent cooling tube 400 by a welded part 410, so that the cooling tubes 400 are connected to each other in series, thus forming a single water/oil path.

As described above, the present invention provides a new arrangement method of a stator water/oil cooling tube for a superconducting rotating machine, which prevents the cooling tube from being bent and solves the problem of the conventional arrangement of cooling tube. Further, the present invention maintains a slot structure supporting the electromagnetic force acting on a stator coil so as to be applicable to a low-speed and high-torque field including a vessel propelling field or a wind power generating field.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A stator cooling structure for a superconducting rotating machine comprising:
    a stator yoke;
    a stator coil disposed in a central cavity of the stator yoke;
    a plurality of slots which are axially disposed at the stator coil to support the stator coil and between which a plurality of axially arranged spaces are defined in a manner such that the stator coil and the stator yoke are exposed through the spaces; and
    a cooling tube wound spirally around each of the plurality of axially arranged spaces in multiple turns and disposed between the stator coil and the stator yoke and in contact with the stator coil and the stator yoke so as to cool both the stator coil and the stator yoke simultaneously.

2. The stator cooling structure as set forth in claim 1, wherein the cooling tube is composed of multiple cooling tubes, each connected to an adjacent cooling tube at an outside of the stator yoke.

3. The stator cooling structure as set forth in claim 2, wherein the cooling tube is fitted in an inlet and outlet path formed in the stator yoke and connected to the adjacent cooling tube at the outside of the stator yoke.

4. The stator cooling structure as set forth in claim 1, wherein the stator yoke is made with laminating materials.

5. The stator cooling structure as set forth in claim 1, wherein the plurality of slots are filled with non-magnetic materials.

6. The stator cooling structure as set forth in claim 5, wherein the non-magnetic materials are fiber-glass reinforced plastics (FRP).

* * * * *